United States Patent [19]

Sphar

[11] Patent Number: 4,609,324
[45] Date of Patent: Sep. 2, 1986

[54] HORIZONTAL LOADER/UNLOADER

[75] Inventor: Cecil H. Sphar, Birmingham, Mich.

[73] Assignee: Sahlin International, Inc., Birmingham, Mich.

[21] Appl. No.: 631,581

[22] Filed: Jul. 17, 1984

[51] Int. Cl.[4] ............................................. B66C 1/02
[52] U.S. Cl. .................................. 414/732; 414/736; 414/737; 414/750
[58] Field of Search ............... 414/749, 752, 743, 732, 414/736, 737, 750

[56] References Cited

U.S. PATENT DOCUMENTS

| | | | |
|---|---|---|---|
| 3,598,263 | 8/1971 | Ehmke | 414/736 X |
| 3,913,756 | 10/1975 | Barron et al. | 414/749 X |
| 4,266,910 | 5/1981 | Pickard | 414/743 X |
| 4,411,586 | 10/1983 | Zitser et al. | 414/750 X |

Primary Examiner—Joseph E. Valenza
Assistant Examiner—D. Glenn Dayoan
Attorney, Agent, or Firm—Harness, Dickey & Pierce

[57] ABSTRACT

A device for heavy duty use in loading or unloading industrial presses comprises a mechanism that tilts a frame (which carries a stroke arm and a work support) in a vertical plane at opposite ends of the stroke so as to provide a desired stroke pattern.

10 Claims, 1 Drawing Figure

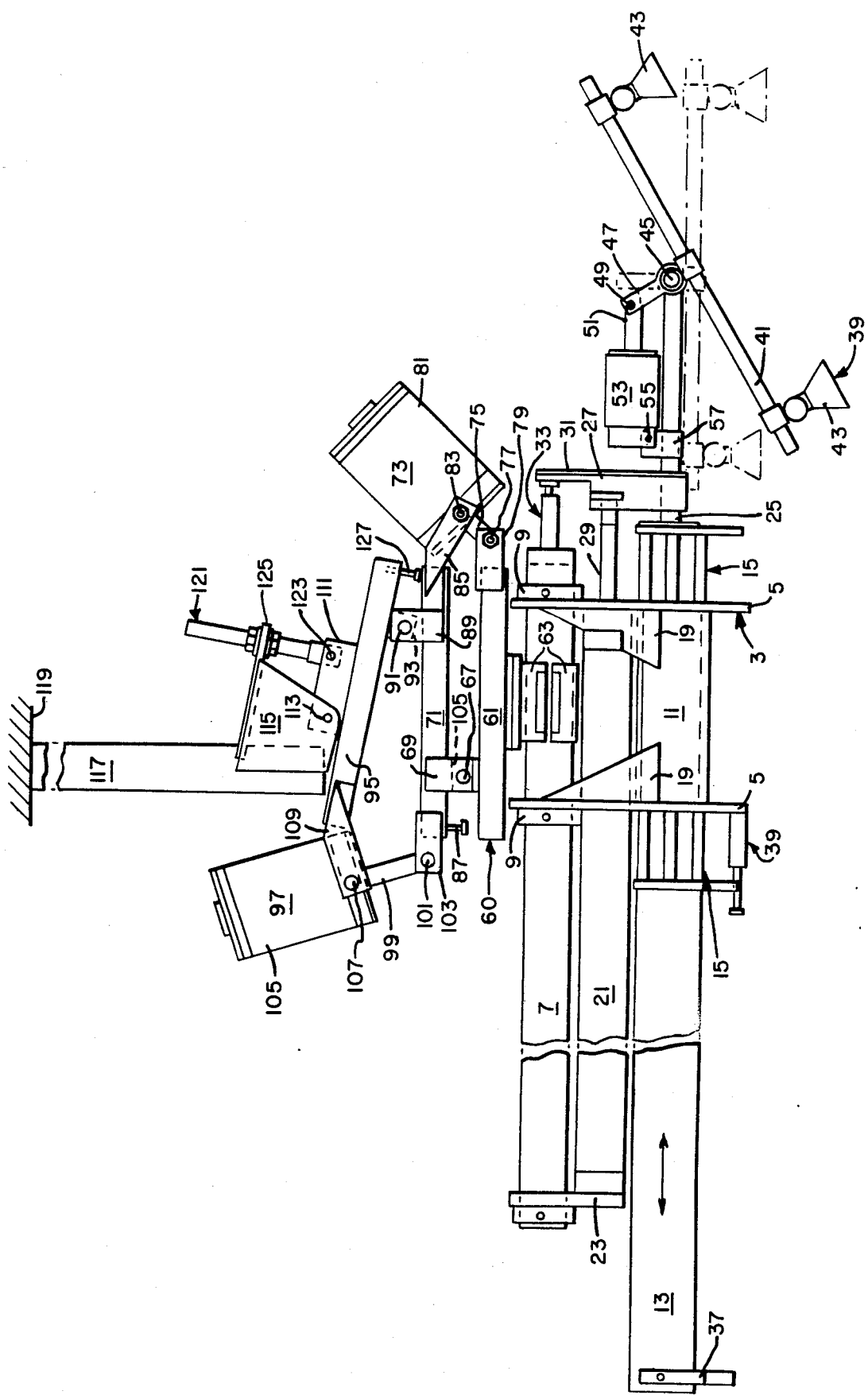

HORIZONTAL LOADER/UNLOADER

This invention relates to heavy duty loading and/or unloading devices of the type that can be used to load or unload heavy, bulky workpieces (such as automotive roof panels) into and out of the dies of industrial presses.

It is the main purpose of the invention to provide a desired stroke pattern for devices of this type and, more particularly, to provide means to obtain desired vertical components at opposite ends of a long (e.g. 65") horizontal, straight line stroke.

This and other objects of the invention are provided in part by means of a special mounting for the frame which carries the stroke arm and workpiece gripping means. This mounting, in preferred form, enables the frame to be tilted up and down as desired at opposite ends of the stroke thereby imparting a pre-selected vertical component of motion to the workpiece gripping means. An automatic leveler device may be mounted on the stroke arm to tilt the workpiece gripping means in such a way as to compensate for tilting of the frame or to provide additional tilt control over the gripping means.

Other features and objects of the invention will become apparent upon consideration of the drawing and the detailed description of the invention.

DESCRIPTION OF THE DRAWING

The drawing is a side elevation, partly schematic and broken away, of a loading and/or unloading device embodying the invention.

DETAILED DESCRIPTION OF THE INVENTION

A presently preferred form of loading and/or unloading device 1 is shown in the drawing and it is intended for heavy duty usage to load and unload heavy and bulky workpieces, such as automotive roof panels, to and from industrial presses. The device may, for example, lift a workpiece (not shown) from a conveyor, move it up to 65" or so into the dies of the press, as well as lift it out of the dies and move it several feet to deposit it on another conveyor.

The device 1 has a frame 3 that includes a pair of vertically extending, horizontally spaced plates 5. At their tops the plates are rigidly secured to a long, horizontal support tube 7, as shown at 9. Their lower portions are rigidly united by a cam follower mechanism 11 for the long, horizontally extending, tubular stroke arm member 13. The member 13 is preferably square in cross section and rides freely on, but is well supported by, cam roll means 15 of mechanism 11 engaging the flat sides of the member 13 and transferring load on the member into the plates 5. The member 13 extends through a tube 17 between the plates and it can be seen that it is confined to straight line, reciprocating motion in a horizontal direction that is perpendicular to the planes of plates 5. The frame also includes the angle shaped brace plates 19 that are rigid with plates 5 and tube 17 and with a long stroke fluid pressure cylinder 21 that drives the stroke member 13. The rear of the cylinder is supported on the support tube 7 by a cross plate 23.

The forward end of tubular stroke arm member 13 is reduced to a rod section 25 that extends through but is also secured to a cross block 27 that is also secured to and moved by the front end of the rod 29 extending out of air cylinder 21 whereby operation of the cylinder 21 reciprocates the member 13. The block 27 has an upwardly extending flange 31 that engages a cushion means 33 extending between the front end of support tube 7 and the block and which therefore serves to cushion the retract or unloading stroke of member 13. The forward or loading stroke is cushioned by cushion means 35 on rear plate 5 that is engaged by the ring 37 secured to the rear end of the member 13. Longitudinal adjustment of ring 37 can also be used as a means to adjust the length of stroke of the member 13.

A workpiece gripping or supporting means 39 is supported at the free end of the stroke member rod 25 whereby it is carried by the member 13 for stroke movement with it and for transferring load into it. The workpiece supporting means 39 may be of any desired and suitable arrangement, a framework 41 carrying vacuum cups 43 being illustrated. (Vacuum cup mechanisms are shown in U.S. Pat. Nos. 3,967,489 and 4,073,602 assigned to the assignee hereof). The framework 41 is pivoted on a horizontal axis at the end of rod 25 as shown at 45 and includes an upwardly extending arm 47. The top end of arm 47 is pivoted at 49 to the free end of piston rod 51 that extends out of the fluid pressure leveler cylinder 53, the cylinder 53 having a body pivoted at 55 to a bracket 57 that is rigidly clamped to the rod 25 (i.e., to stroke arm member 13). The leveler cylinder 53 can be actuated to tilt framework 41 about axis 45 to maintain the vacuum cups 43 in a level position (see phantom line portion in the drawing) or a desired orientation despite tilting of the frame 3 and stroke member 13 in a manner to be presently described.

Adjacent the top of frame 3 is a stroke end motion actuating and load support mechanism 60 that includes and is supported on a first horizontal support bar 61 which is rigidly held parallel to the stroke arm member 13 by means of a pinch block clamp 63 that removably attaches it to support tube 7. The support bar 61 has rigid upstanding lug means 65 adjacent its left end that is pivoted at 67 to downwardly extending lug means 69 rigidly attached to a second horizontally extending support bar 71. Support bars 61 and 71 are also interconnected at their right ends by a first fluid pressure cylinder means 73 that includes a piston rod 75 which is pivoted at 77 to a rigid extension 79 on the first support bar 61. The cylinder means 73 also includes a body 81 that is pivotally affixed at 83 to a bracket 85 that forms a rigid extension of support bar 71. If pressure fluid is applied to cylinder means 73, the rod 75 will be forced out of the body 81 and the bar 61 and the frame 5 (including member 13 and workpiece gripping means 39) will be tilted in a downward, clockwise direction about axis 67. The maximum degree of this tilt can be positively controlled by an adjustable screw type stop 87 extending from the bottom of the left end of second support bar 71 in a position where it will be engaged by the left end of first support bar 61 as it pivots clockwise about axis 67.

The second support bar 71 has a rigid, upstanding leg means 89 adjacent its right end and it is pivoted at 91 to a rigid, downwardly extending lug means 93 on a third horizontally extending support bar 95. Support bars 71 and 95 are also interconnected at their left ends by a second fluid pressure cylinder means 97 that includes a piston rod 99 which is pivoted at 101 to a rigid extension 103 on the second support bar 71. The cylinder means also includes a body 105 that is pivotally affixed at 107 to a bracket 109 that forms a rigid extension of support bar 95.

The third support bar 95 has an upstanding flange means 111 that is pivoted at 113 to a hanger support bracket 115 which is rigidly affixed to and carried by a rigid structural member 117 of the machine or structure 119 on which the device 1 is mounted. The angle of incline of support bar 95 is adjustable by means of adjustment screw means 121 that is pivoted at 123 to flange means 111 and secured to a flange 125 extending from bracket 115. Because of mechanism 121, the third support bar 95 is fixed in selected horizontally extending position. Load of the device 1, and the workpieces it carries, is transferred by the mechanism 60 including the third support bar 95 into the bracket 115 and thus into structure 119.

If the second pressure cylinder means 97 is actuated to retract piston rod 99, the left end of second support bar 71 will be pulled up so that the bar 71 and everything beneath it tilts in a clockwise direction around axis 91. If the cylinder means 97 is actuated to extend the rod 99, the maximum degree of movement can be positively controlled by the stop screw mechanism 127 extending from the bottom of the right end of support bar 95 in a position where it can be engaged by the right end of support bar 71.

The degree of vertical movement can also be adjusted by the longitudinal position of the mechanism 60 on the support tube 7 of the frame 3. If, for example, the pinch clamp 63 is clamped on the tube 7 near its left end, instead of between frame plates 5, the vertical motion of work holding means 39 during tilting about axis 67 and axis 91 will be substantially greater than in the position illustrated.

A suitable control system (not shown) is provided to control and synchronize operation of pressure cylinders 21, 53, 73, and 97 and the vacuum source for vacuum cups 43. The two cylinders 73 and 97 are always operated independently so that when one is operating the other is stopped whereby tilting takes place about only one of the first and second pivots 67 or 91.

In operation as a loader, assume that in the retract position of the drawing the device 1 picks up a workpiece from a conveyor or the like andthat at the end of the extend stroke it releases the workpiece into the die of a press. Before operation, the work gripping means 39 is pre-set so that the vacuum cups 43 are on the right angle to pick up the workpiece from the conveyor. With the device in retract position, and the control cycle initiated, pressure cylinder means 73 and the vacuum source are activated simultaneously so that the work gripping means 39 moves down as rod 75 is extended. A timer is also activated and when the contact phase is timed out cylinder means 73 reverses, retracting rod 75, and raising the workpiece. The device stays in that position until it receives a signal that the die is ready to receive the workpiece. This activates cylinder 21 to move stroke arm member 13 to the right, starts timing means (1) to activate leveler cylinder 53 to rotate the work gripping means 39 to a desired orientation for the stroke and to enter the die, (2) to activate cylinder means 97 to retract rod 99 and set the workpiece down in the die when it reaches it, and (3) to release vacuum in cups 43 when the workpiece is set down in the die. When the workpiece is set down and released in the die, the timing means is timed out, vacuum is off, cylinder 97 is activated to extend rod 99 and raise the work holding means 39, cylinder 21 is activated to move the stroke member 13 and means 39 to the retract position, and leveler cylinder 53 is activated to rotate the means 39 back to the pre-set orientation.

In operation as an unloader, the workpiece gripping means 39 is pre-set to the desired angle to properly contact the workpiece in the die. On initiation of an unloading cycle, the vacuum source is activated as is cylinder 21 to move the work holding means to the right and cylinder means 97 starts timing to retract the rod 99, which commences when the means 39 is in the die so that it drops on to the workpiece enabling cups 43 to grip it. The timing means causes cylinder 97 to reverse to extend rod 99 and raise the means 39 and workpiece off the die. At this point cylinder 21 is activated to retract the stroke arm 13 bringing the workpiece with it. This starts timing of cylinder 73 to extend rod 75 when the arm 13 is fully retracted and timing of the vacuum source to stop vacuum. When arm 13 is fully retracted rod 75 extends to move the workpiece down on to the conveyor, or otherwise, and vacuum is cut-off so it is released. As soon as this occurs, the cylinder 73 reverses, rod 75 is retracted, and the means 39 is raised up to normal position ready to repeat the unloading cycle. If desired or needed, the leveler cylinder 53 can be timed into the unloading cycle to control the orientation of the means 39 during the cycle as was mentioned in connection with the loading cycle.

The invention produces a stroke pattern that is essentially flat between the two end points, i.e., left or retract end for pickup (loader mode) or release (unloader mode) and right or extended end for release (unloader mode) or pickup (loader mode). It is contemplated that the length of the stroke vary widely and can be long, e.g. 65"–84". Similarly, the vertical movement at each end can vary widely, from no vertical movement to movement in terms of feet. Various adjusting means with respect to these distances have been described above.

Modifications may be made in the specific structure shown without departing from the spirit and scope of the invention.

I claim:

1. A heavy duty horizontal loader and/or unloader for industrial presses or the like comprising a frame, an elongated stroke member mounted on the frame for substantially straight line horizontal reciprocating movement between an extended press loading and unloading position and a retracted position, workpiece supporting means pivotally attached to an end of the stroke member and movable with said stroke member between said extending and retracted positions, pressure cylinder means mounted on the frame and operatively connected to the stroke member for moving it and the work supporting means between said extended and retracted positions, frame moving means to move at least a portion of the frame in a vertical direction when said workpiece supporting means is at said extended and retracted positions and including means for mounting the frame to tilt about a first horizontal axis adjacent said extended position, and first pressure cylinder means connected to the frame to tilt said frame about said first axis to thereby move the end of the stroke member and the work supporting means in a vertical direction at the extended position, said frame moving means including means for mounting the frame to tilt about a second horizontal axis spaced horizontally from the first axis in a direction away from said extended position and second pressure cylinder means connected to the frame to tilt it about said second axis to thereby move the end of the stroke member and the work supporting means in a vertical direction at the retracted position.

2. A heavy duty horizontal loader and/or unloader for industrial presses or the like comprising a frame, an elongated stroke member mounted on the frame for substantially straight line horizontal reciprocating movement between an extended press loading and unloading position and a retracted position, workpiece supporting means attached to an end of the stroke member and movable with said stroke member between said extending and retracted positions, pressure cylinder means mounted on the frame and operatively connected to the stroke member for moving it and the work supporting means between said extended and retracted positions, frame moving means to move at least a portion of the frame in a vertical direction when said workpiece supporting means is at said extended and said retracted positions, said frame moving means including means for mounting the frame to tilt about a first horizontal axis adjacent said extended position, and first pressure cylinder means connected to the frame to tilt it about said first axis to thereby move the end of the stroke member and the work supporting means in a vertical direction at the extended position, said frame moving means including means for mounting the frame to tilt about a second horizontal axis located remote from said extended position and second horizontal axis to thereby move the end of the stroke member and the work supporting means in a vertical direction at the retracted position.

3. A heavy duty horizontal loader and/or unloader for industrial presses or the like comprising a frame, an elongated stroke member mounted on the frame for substantially straight line horizontal reciprocating movement between an extended press loading and unloading position and a retracted position, workpiece supporting means attached to an end of the stroke member and movable with said stroke member between said extended and retracted positions, pressure cylinder means mounted on the frame and operatively connected to the stroke member for moving said stroke member and the work supporting means between said extended and retracted positions, a stroke end motion actuating and frame supporting mechanism including at its bottom portion a first horizontally extending rigid support bar, said frame being secured to said first support bar, a second horizontally extending support bar spaced above the first bar, first pivot means between the first and second support bars whereby tilting of the frame about said first pivot means raises and lowers the end of the stroke member and the workpiece supporting means, first pressure cylinder means including a cylinder affixed to one of said first and second support bars and a rod pivoted to the other of said first and second support bars, said first cylinder means serving to energize tilting of the frame about said first pivot means, a third horizontally extending support bar spaced above the second bar, second pivot means between the second and third support bars whereby tilting of the frame about the second pivot means raises and lowers the end of the stroke member and the workpiece supporting means, second pressure cylinder means including a cylinder affixed to one of said second and third support bars and a rod pivoted to the other of said second and third support bars, said second cylinder means serving to energize tilting of the frame about the second pivot means.

4. A device as set forth in claim 3 including hanger bracket means for mounting the loader and/or unloader to a fixed support, said third support bar being adjustably secured to said bracket means, whereby the angle of the third support bar to the horizontal can be preadjusted.

5. A device as set forth in claim 3 wherein the cylinder of said first pressure cylinder means is affixed to said second support bar and the rod of said first pressure cylinder means is pivoted to the first support bar to provide for vertical movement of the workpiece supporting means at the retract end of the stroke of said stroke member.

6. A device as set forth in claim 5 wherein the cylinder of said second pressure cylinder means is affixed to the third support bar and the rod of second pressure cylinder means is pivoted to the second support bar to provide for vertical movement of the workpiece supporting means at the extend end of the stroke of said stroke member.

7. A device as set forth in claim 6 wherein said first pivot means is located below and more remote from the extended position than the second pivot means.

8. A device as set forth in claim 3 including first tilt angle adjustment means between the first and second support bars to control the maximum angle of tilt about the first pivot means, and second tilt angle adjustment means between the second and third support bars to control the maximum angle of tilt about the second pivot means.

9. A device as set forth in claim 3 wherein said frame includes an elongated horizontally extending support tube, removable clamp means for clamping said first support bar and thus said frame supporting mechanism at a preselected position along the length of said support tube.

10. In a heavy duty horizontal loader and/or unloader device for industrial presses or the like, said device including a frame, an elongated stroke member mounted on the frame for substantially straight line horizontal reciprocating movement between an extended position and a retracted position, workpiece supporting means movably attached to an end of the stroke member and movable with said stroke member between said extended and retracted positions, pressure cylinder means mounted on the frame and operatively connected to the stroke member for moving said stroke member and the work supporting means between said extended and retracted positions, a stroke end motion actuating and frame supporting mechanism comprising a first horizontally extending rigid support bar at the bottom of said mechanism, clamp means for clamping said support bar and mechanism to said frame, a second horizontally extending support bar spaced above the first bar, first pivot means between the first and second support bars whereby tilting of the frame about said first pivot means raises and lowers the end of the stroke members and the workpiece supporting means, first pressure cylinder means including a cylinder affixed to one of said first and second support bars, said first cylinder means serving to energize tilting of the frame about said first pivot means, a third horizontally extending support bar spaced above the second bar, second pivot means between the second and third support bars whereby tilting of the frame about the second pivot means raises and lowers the end of the stroke member and the workpiece supporting means, second pressure cylinder means including a cylinder affixed to one of said second and third support bars and a rod pivoted to the other of said second and third support bars, said second cylinder means serving to energize tilting of the frame about the second pivot means.

* * * * *